Jan. 13, 1931.                W. R. FISHER                1,788,621
                               LATHE CENTER
                             Filed Aug. 6, 1926
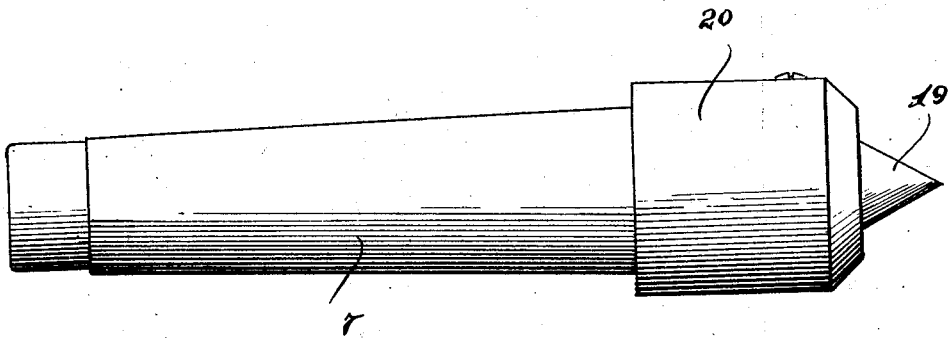
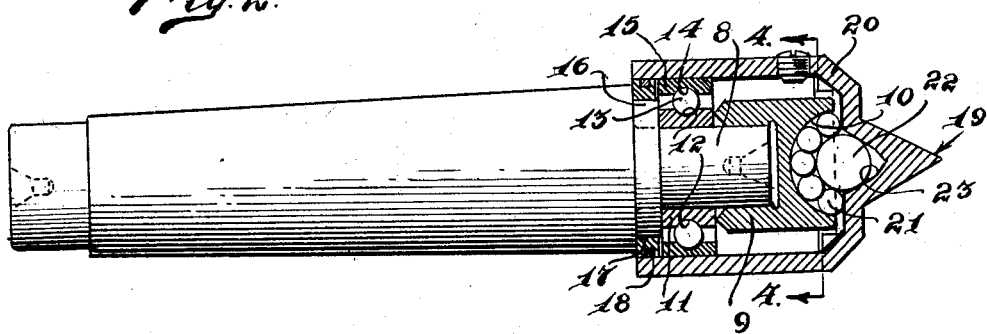
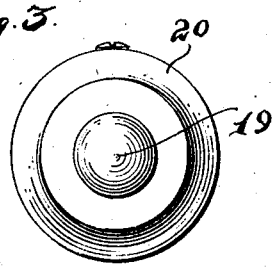
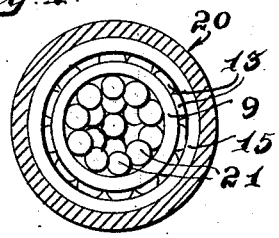
INVENTOR.
W. Reuen Fisher
BY
Thos. L. Donnelly
ATTORNEY.

Patented Jan. 13, 1931

1,788,621

UNITED STATES PATENT OFFICE

W. REUEN FISHER, OF DETROIT, MICHIGAN

LATHE CENTER

Application filed August 6, 1926. Serial No. 127,518.

My invention relates to a new and useful improvement in a lathe center, and has for its object the provision of a lathe center adapted for taking the thrust on the forward end and also receiving a portion of the radial load.

Another object of the invention is the provision of a center point so constructed and arranged as to permit the use of a small taper on the bearing point.

Another object of the invention is the provision of a center point having a separate rotatable head supported on a spindle and projecting well out into the bearing point itself.

Another object of the invention is the provision of a lathe center having a rockable bearing point, so constructed and arranged as to permit a slight rocking of the bearing point and at the same time reduce the error resulting from the operation of the bearing point to a minimum.

Another object of the invention is the provision of a lathe center having a bearing point adapted to operate efficiently and to be free from the difficulties and disadvantages which arise and cause a burning of the bearing point.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Fig. 2 is a view similar to Fig. 1 showing the head in central longitudinal vertical section.

Fig. 3 is a front elevational view of the invention.

Fig. 4 is a sectional view taken on substantially line 4—4 of Fig. 2.

The invention comprises a shank or spindle 7 which is tapered for fitting into a tail stock or other retaining member. The forward end of the spindle or shank 7 has a reduced extension 8, mounted upon which is the cup-shaped member 9 having, formed in the outer surface of its base, a semi-spherical recess or pocket 10. Pressed upon the portion 8, as a press fit, is a ring 11 having a groove 12 formed in its periphery for accommodating the ball bearings 13 which rest in a groove 14 formed in a ring 15. Pressed upon a shoulder 16 is a lubricating ring 17 having a packing 18 positioned in a peripheral groove, this packing 18 being saturated with lubricant if desired. The bearing point or work engaging center 19 is formed integral with the cup-shaped head 20, which is mounted as a press fit on the ring 15 so that the ring 15 will serve to rotate with the head 20, the ball bearings 13 reducing the friction to a minimum. Positioned in the semi-spherical pocket 10, so as to form a layer for the same, are ball bearings 21 which are engaged by a larger ball bearing 22 which extends into a pocket 23 formed on the inner surface of the head 19 so that the ball 22 serves as a supporting member for the head 20 and extends well inwardly of the work engaging center 19, thus effecting a supporting of the bearing point 19. The bearing point 19, on account of its mounting, may be formed with a small or rather blunt taper, thus obtaining the advantages from such a structure.

It will be noted that there is a slight space between the end of the reduced portion 8 and the base of the cup-shaped member 9 and that the base of the cup-shaped head 20 is separated a slight distance from the base of the cup-shaped member 9. The longitudinal thrust delivered to the head 20 from the work engaging center 19 will be transmitted through the ball 22 to the balls 21.

A slight rocking of the head 20 is permitted with this structure, the point of fulcrum being the axis of the sphere 22 so that the rearward end of the head 20 may rock through a greater distance than the end of the work engaging center 19. This gives the necessary flexibility to a device of this kind, while reducing to a minimum the error resulting from the rocking movement, this error being reduced on account of the difference in the distance from the end of the work engaging center 19 to the fulcrum and the distance from the end of the head 20 to the fulcrum.

It will also be noted that the thrust is spread over the balls 21 through the ball 22 so that the direct thrust is transmitted over a maximum area.

While I have illustrated and described the preferred form of structure, I do not wish to limit myself to the precise form of structure shown, but desire to avail myself of such variations and modifications as may come within the scope of the appended claims.

Having thus described my invention what I claim as new and desire to secure by Letters Patent is:

1. A lathe center of the class described comprising a shank; a reduced portion on said shank; a further reduced portion projecting centrally outwardly from said reduced portion; a cup-shaped head; a work engaging center projecting outwardly centrally from said head, said work engaging center being hollow; a bearing ring fixedly mounted on said further reduced portion; ball bearings engaging the periphery of said bearing ring; a retaining ring for retaining said ball bearings on said bearing ring, said head being positioned over and engaging snugly the periphery of said retaining ring; a cup-shaped bearing head mounted in said first mentioned head and embracing the end of said further reduced portion, the base of said bearing head being recessed substantially semi-spherically on its outer surface; a layer of ball bearings in said recess; and a larger bearing engaging said ball bearings and projecting inwardly of said work engaging center point.

2. A lathe center of the class described comprising a shank; a head; a work engaging center on said head; means for retaining said head on said shank and permitting said head and said work engaging center to rock on a point within said work engaging center relatively to said shank.

3. A lathe center of the class described comprising a shank; a head; means for mounting said head rotatably on said shank and oscillatory relatively thereto transversely of the longitudinal axis of said shank; a work engaging center on said head, the point of oscillation of said head and said work engaging center being adjacent the forward end of said head.

4. A lathe center of the class described comprising a shank; a head rotatably mounted on said shank; a work engaging center on said head, said head and said work engaging center being rockable transversely of the longitudinal axis of said shank; and a curvilinearly surfaced bearing member for supporting said head and permitting said oscillation.

5. A lathe center of the class described, comprising: a shank; a head rotatably mounted on said shank and embracing one end thereof; a work engaging center projecting outwardly from one side of said head; a ball retainer mounted within said head and having a recess formed therein for the reception of a plurality of balls; and an enlarged ball bearing engaging said balls and the inner surface of said work engaging center.

6. A lathe center of the class described, comprising: a shank; a head rotatably mounted on said shank and embracing one end thereof; a work engaging center projecting outwardly from one side of said head; a ball retainer mounted within said head and having a recess formed therein for the reception of a plurality of balls; and an enlarged ball bearing engaging said balls and the inner surface of said work engaging center, said head and said work engaging center being rockable in unison within predetermined limits on said enlarged ball as a fulcrum.

7. A lathe center of the class described comprising: a shank; a hollow head rotatably mounted on the forward end of said shank; a work engaging center projecting outwardly from the base of said head, centrally thereof; and curvilinearly surfaced means for engaging the inner surface of said head at the point of projection of said work engaging center for forming a fulcrum for said head, said head and said work engaging center being rockable relatively to said shank on said fulcrum.

In testimony whereof I have signed the foregoing.

W. REUEN FISHER.